(12) United States Patent
Sato et al.

(10) Patent No.: US 7,226,025 B2
(45) Date of Patent: Jun. 5, 2007

(54) STRUCTURE FOR MOUNTING MULTI-OPTICAL AXIS PHOTOELECTRIC SENSOR

(75) Inventors: Toshinori Sato, Fukuchiyama (JP); Satoru Shimokawa, Ohtsu (JP)

(73) Assignee: Omron Corporation, Kyoto-shi (JP)

( * ) Notice: Subject to any disclaimer, the term of this patent is extended or adjusted under 35 U.S.C. 154(b) by 71 days.

(21) Appl. No.: 11/236,857

(22) Filed: Sep. 28, 2005

(65) Prior Publication Data
US 2006/0219874 A1   Oct. 5, 2006

(30) Foreign Application Priority Data
Sep. 30, 2004   (JP)   ............................. 2004-289281

(51) Int. Cl.
*F16M 11/00*   (2006.01)
(52) U.S. Cl. ............. 248/200; 248/221.41; 248/229.11
(58) Field of Classification Search ................ 248/200, 248/223.41, 229.11, 229.22, 228.2, 231.31; 271/31, 149, 31.1; 324/207.2, 207.26, 207.13; 211/94.01, 162
See application file for complete search history.

(56) References Cited

U.S. PATENT DOCUMENTS

| | | | | |
|---|---|---|---|---|
| 4,869,378 A | * | 9/1989 | Miller | ...................... 211/94.01 |
| 5,375,802 A | * | 12/1994 | Branham, II | ............ 248/221.11 |
| 6,119,878 A | * | 9/2000 | Zen | .......................... 211/94.01 |
| 6,772,890 B2 | * | 8/2004 | Campbell et al. | ......... 211/94.01 |
| 2005/0247653 A1 | * | 11/2005 | Brooks | ..................... 211/94.01 |

FOREIGN PATENT DOCUMENTS

JP   2003-242868   8/2003

\* cited by examiner

*Primary Examiner*—Ramon O Ramirez
(74) *Attorney, Agent, or Firm*—Foley & Lardner LLP

(57) ABSTRACT

To provide a structure for mounting a multi-optical axis photoelectric sensor, where a multi-optical axis photoelectric sensor is mounted on the base while both ends and the back face thereof are not gripped, and thereby the space for mounting the multi-optical axis photoelectric sensor can be reduced and the multi-optical axis photoelectric sensor can be mounted from the front face thereof. The structure for mounting a multi-optical axis photoelectric sensor comprises: a rail-shaped projecting portion, formed on the side face of a columnar case along the longitudinal direction thereof, a movable-side member, having a gripping mechanism which detachably grips a rail-shaped projecting portion of the columnar case, a mounting portion, mountable on a supporting wall from the side facing the supporting wall, and a fixed-side member, rotatably supporting the movable-side member via a supporting mechanism, with the mounting portion mounted in a state where the columnar case is positioned on the side of the mounting portion.

12 Claims, 20 Drawing Sheets

B  Side view  
A  Front view

C  Bottom view

STRUCTURE FOR MOUNTING MULTI-OPTICAL AXIS PHOTOELECTRIC SENSOR

BACKGROUND OF THE INVENTION

1. Field of the Invention

The present invention relates to a structure for mounting a multi-optical axis photoelectric sensor on a base of a machine tool or the like, and particularly to a structure for mounting a multi-optical axis photoelectric sensor, where a multi-optical axis photoelectric sensor can be mounted from the front face thereof and a mounting space can be reduced.

2. Description of the Related Art

In recent years, a multi-optical axis photoelectric sensor is in frequent use for a machine tool or the like for monitoring intrusion into a danger area. In the case of mounting such a multi-optical axis photoelectric sensor, it is necessary to position a light projector and a light receiver to be mutually opposed so that the light receiver can receive a light ray projected from a light projector. Hence it is necessary that in the structure for mounting a multi-optical axis photoelectric sensor, the orientation of the sensor can be adjusted.

Therefore, amounting structure has been developed, where a rotating axis is provided at the end of the multi-optical axis photoelectric sensor to adjust the orientation of the sensor. However, since the photoelectric sensor cannot be mounted on amounting structure portion, a dead space is unfavorably created at each end of the multi-optical axis photoelectric sensor. Further, although it is necessary to arrange a plurality of multi-optical axis photoelectric sensors in the case where a mounting place requires a large light curtain, when the multi-optical axis photoelectric sensors are arranged in a line, an aperture in the light curtain is unfavorably created in the mounting structure part. Therefore, a mounting structure has been developed, where a position of a rotation angle of the multi-optical axis photoelectric sensor is adjustable with the use of a mounting device provided on the back face of the multi-optical axis photoelectric sensor (e.g. Japanese Patent Laid-Open No. 2003-242868).

However, since the mounting device 10 grips the side face Ab and the back face Aa of the multi-optical axis photoelectric sensor A, a portion of a base, for mounting a multi-optical axis photoelectric sensor, needs a space for the mounting device 10 in addition to the space for the multi-optical axis photoelectric sensor. There has thus been a problem in that, when the mounting portion is small, the mounting device 10 cannot be used.

SUMMARY OF THE INVENTION

The present invention was provided for solving the foregoing problem of the prior art, and has an object to provide a structure for mounting a multi-optical axis photoelectric sensor, where a multi-optical axis photoelectric sensor can be mounted on a base while each end and the back face thereof are not gripped, and thereby the space for mounting the multi-optical axis photoelectric sensor can be reduced and the multi-optical axis photoelectric sensor can be mounted from the front face thereof.

Still another object and functional effect of the present invention will be readily understood by the skilled in the art by reference to the following description in the specification.

A structure for mounting a multi-optical axis photoelectric sensor according to the present invention is a structure, where a columnar case for light projection or light reception that constitutes a multi-optical axis photoelectric sensor is mounted on a supporting wall with the back face of the columnar case facing the supporting wall side, to enable adjustment of an angle of light axis. The structure for mounting a multi-optical axis photoelectric sensor comprises: a rail-shaped projecting portion, formed on one side face or each side face of the columnar case along the longitudinal direction thereof, a movable-side member, having a gripping mechanism which detachably grips a rail-shaped projecting portion of the columnar case, a mounting portion, mountable on a supporting wall from the side facing the supporting wall, and a fixed-side member, rotatably supporting the movable-side member via a supporting mechanism, with the mounting portion mounted in a state where the columnar case is positioned on the side of the mounting portion, and further comprises a position fixing mechanism which fixes a positional relation between the movable-side member and the fixed-side member in an arbitrarily rotated position, whereby the fixed-side member positioned on the side of the columnar case makes the columnar case adjustable to an arbitrary optical axis angle via the movable-side member.

According to such a constitution of the present invention, the multi-optical axis photoelectric sensor is mounted on the base in an angle-adjustable manner only by gripping of the rail-shaped projecting portion formed along the longitudinal direction of the multi-optical axis photoelectric sensor, without gripping of both ends and the back face of the sensor. This allows elimination of a dead space at each end of the multi-optical axis photoelectric sensor as well as a mounting space on the back face thereof. Further, mounting of the multi-optical axis photoelectric sensor from the front face thereof can facilitate the mounting operation. It is to be noted that the front face of the multi-optical axis photoelectric sensor is a face where light projection or light reception of each light axis of the multi-optical axis photoelectric sensor is performed, as shown in the front view A of FIG. 2.

In one preferred embodiment of the structure for mounting a multi-optical axis photoelectric sensor according to the present invention, with the front face of the multi-optical axis photoelectric sensor being the upper side and the back face thereof being the lower side, the gripping mechanism comprises: a lower claw member, having a claw-shaped portion to be engaged with the lower part of the rail-shaped projecting portion, an upper claw member, having a claw-shaped portion to be engaged with the upper part of the rail-shaped projecting portion, and a screw mechanism, which fastens the lower claw member and the upper claw member.

According to such a configuration, the multi-optical axis photoelectric sensor can be certainly gripped only by fastening screws.

In one preferred embodiment of the structure for mounting a multi-optical axis photoelectric sensor according to the present invention, the structure is constituted such that the supporting mechanism for rotatably supporting the movable-side member on the fixed-side member allows an arc-shaped guiding convex face provided on the movable-side member to be slid over an arc-shaped guiding concave face provided on the fixed-side member.

Moreover, the structure may also be constituted such that the movable-side member comprises an arc-shaped guiding concave face, the fixed-side member comprises an arc-shaped guiding convex face, and the supporting mechanism for rotatably supporting the movable-side member on the fixed-side member allows the arc-shaped guiding convex face provided on the fixed-side member to be slid over the arc-shaped guiding concave face provided on the movable-side member.

Furthermore, as one embodiment, the structure is constituted such that the movable-side member further comprises an arc-shaped guiding concave face concentric to the arc-shaped guiding convex face, the fixed-side member further comprises an arc-shaped guiding convex face, and the supporting mechanism for rotatably supporting the movable-side member on the fixed-side member allows the arc-shaped guiding convex face provided on the movable-side member to be slid over an arc-shaped guiding concave face provided on the fixed-side member, or allows the arc-shaped guiding convex face provided on the fixed-side member to be slid over an arc-shaped guiding concave face provided on the movable-side member.

According to such a constitution, since the center of rotation of the multi-optical axis photoelectric sensor can be on the arc-shaped guiding convex face and the arc-shaped guiding concave face, the rotation of the multi-optical axis photoelectric sensor can be freely designed.

Further, in one preferred embodiment of the structure for mounting a multi-optical axis photoelectric sensor according to the present invention, the sensor is constituted such that the center of arcs of the arc-shaped guiding convex face and the arc-shaped guiding concave face is a light emitting point or a light receiving point of the multi-optical axis photoelectric sensor. According to such a constitution, the multi-optical axis photoelectric sensor can be rotated about the light emitting point or the light receiving point as a center, which can facilitate an operation of positioning the multi-optical axis photoelectric sensor. The light emitting point or the light receiving point includes a point on each light axis connecting a lens center with a light emitting element or a light receiving element.

Further, in one preferred embodiment of the structure for mounting a multi-optical axis photoelectric sensor according to the present invention, the sensor is constituted such that the arc-shaped guiding concave face comprises a projecting portion for preventing the arc-shaped face from dropping. According to such a constitution, an operation of building the mounting device can be facilitated.

Further, in one preferred embodiment of the structure for mounting a multi-optical axis photoelectric sensor according to the present invention, the sensor is constituted such that the fixed-side member includes a mounting angle and a gripping member, constituting a screw mechanism which fastens a screw in a direction from the front face of the multi-optical axis photoelectric sensor toward the back face thereof so as to fix the fixed-side member and the multi-optical axis photoelectric sensor to one another, the gripping member has the arc-shaped guiding convex face of the fixed-side member and a taper face inclined with respect to the direction in which the screw mechanism fastens a screw, the mounting angle has: the arc-shaped guiding concave face of the fixed-side member, and a taper receiving face, which is inclined in the same direction as the taper face of the gripping member in a state of being fixed to the gripping member, and is in contact with the taper face, the screw mechanism is fastened to generate force in a screw fastened direction and force in a direction along the taper face, so as to press-hold the arc-shaped guiding convex face of the gripping member on the arc-shaped guiding concave face of the movable-side member, and press-hold the arc-shaped guiding convex face of the movable-side member on the arc-shaped guiding concave face of the mounting angle. According to such a constitution, the movable-side member as member for holding the rail from both sides thereof can be fixed only by fastening screws.

As apparent from the above description, according to the structure for mounting a multi-optical axis photoelectric sensor according to the present invention, the multi-optical axis photoelectric sensor can be mounted on a base while both ends and the back face thereof are not gripped, and thereby the space for mounting the multi-optical axis photoelectric sensor can be reduced and the multi-optical axis photoelectric sensor can be mounted from the front face thereof.

DESCRIPTION OF THE PREFERRED EMBODIMENTS

In the following, one preferred embodiment of the structure for mounting a multi-optical axis photoelectric sensor according to the present invention is specifically described in accordance with attached drawings. It is to be noted that the embodiment described in the following merely shows one example of the present invention, and it goes without saying that the scope of the structure for mounting a multi-optical axis photoelectric sensor according to the present invention is specified only by the description of the claims.

Figure 1:
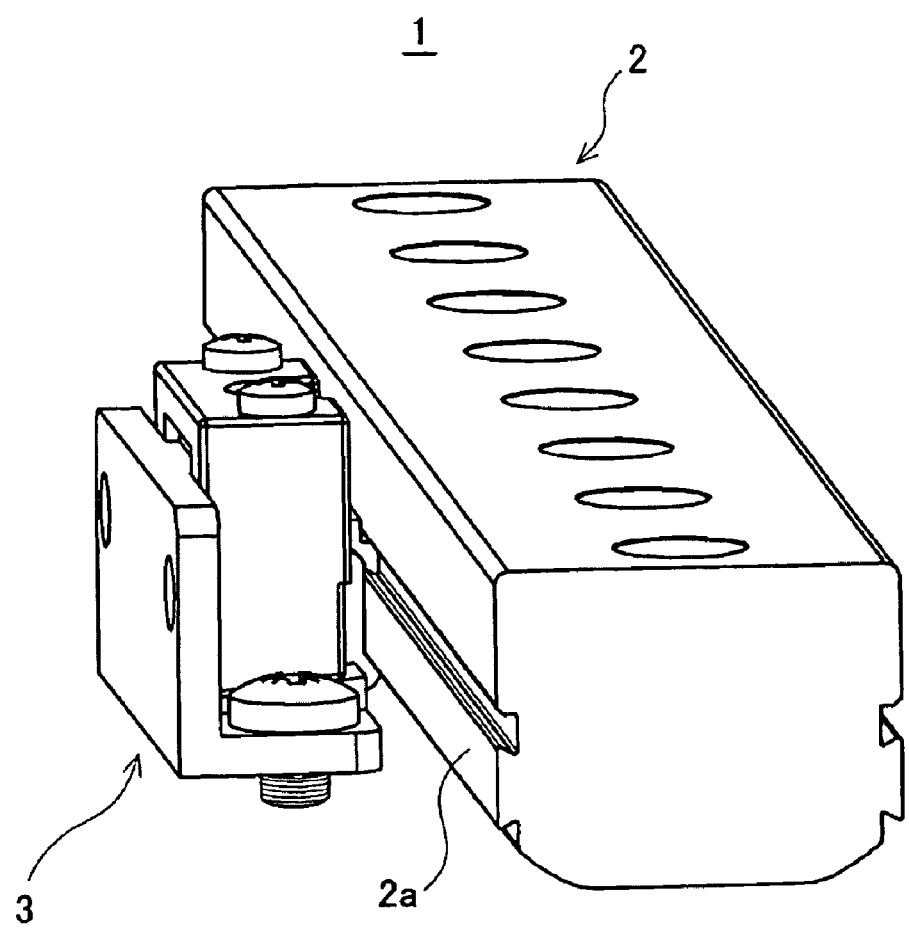
FIG. 1 shows an overall oblique view of a structure for mounting a multi-optical axis photoelectric sensor according to the present invention.
Figure 2:
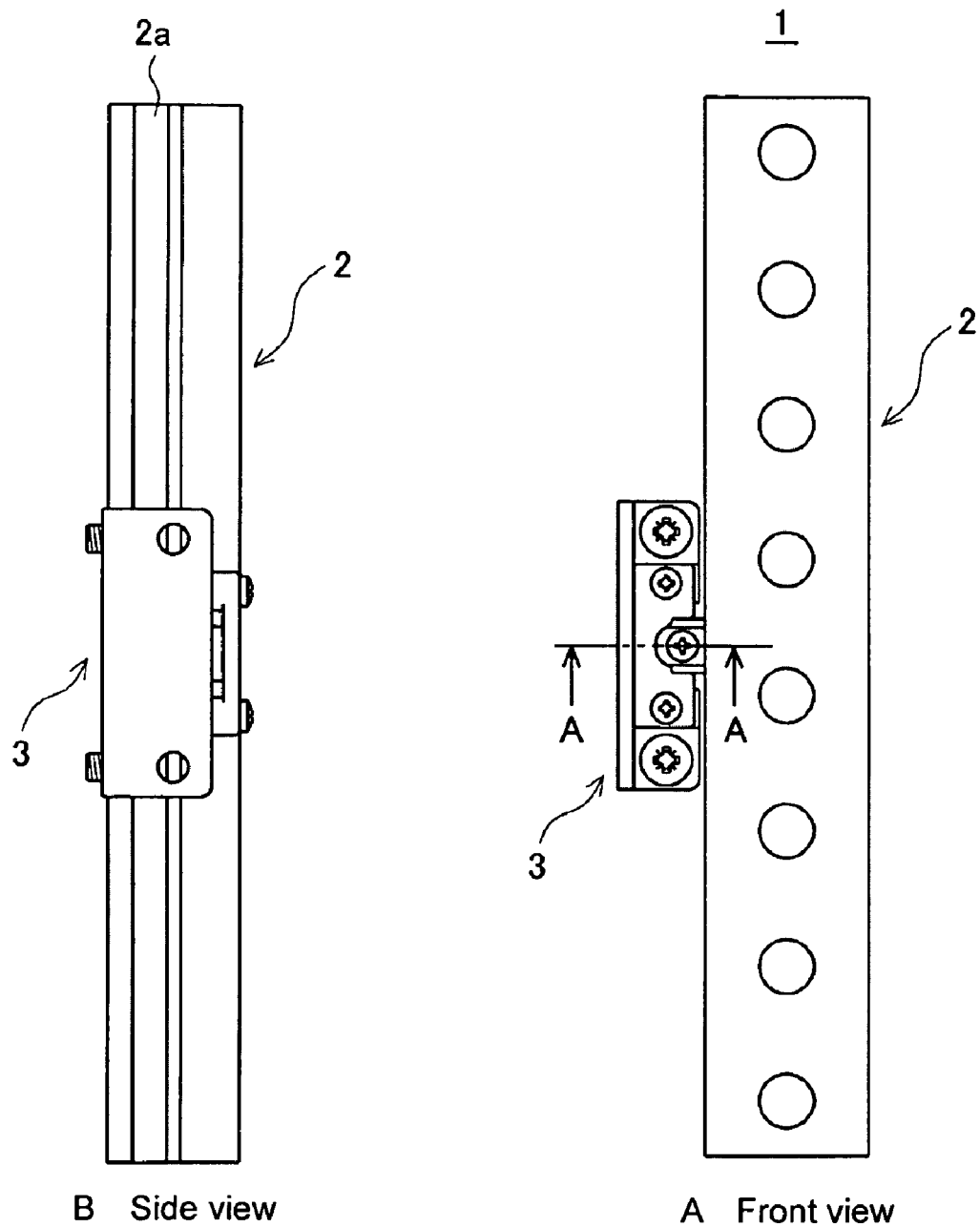
FIG. 2 shows a trihedral view of the structure for mounting a multi-optical axis photoelectric sensor according to the present invention.
Figure 2:
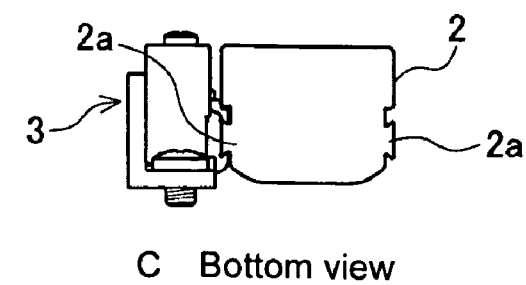

FIG. 1 shows an overall oblique view of a structure for mounting a multi-optical axis photoelectric sensor according to the present invention. As shown in the figure, a structure 1 for mounting a multi-optical axis photoelectric sensor is composed of a multi-optical axis photoelectric sensor 2 and a mounting device 3. A projecting portion 2*a* is formed on the side face of the multi-optical axis photoelectric sensor 2. The mounting device 3 holds the projecting portion 2*a* from both sides thereof. The mounting device 3 is then mounted on a base (not shown) so that the multi-optical axis photoelectric sensor 2 is mounted on the base. It should be noted that FIG. 2 shows a trihedral view of the structure 1 for mounting a multi-optical axis photoelectric sensor.

Figure 3:
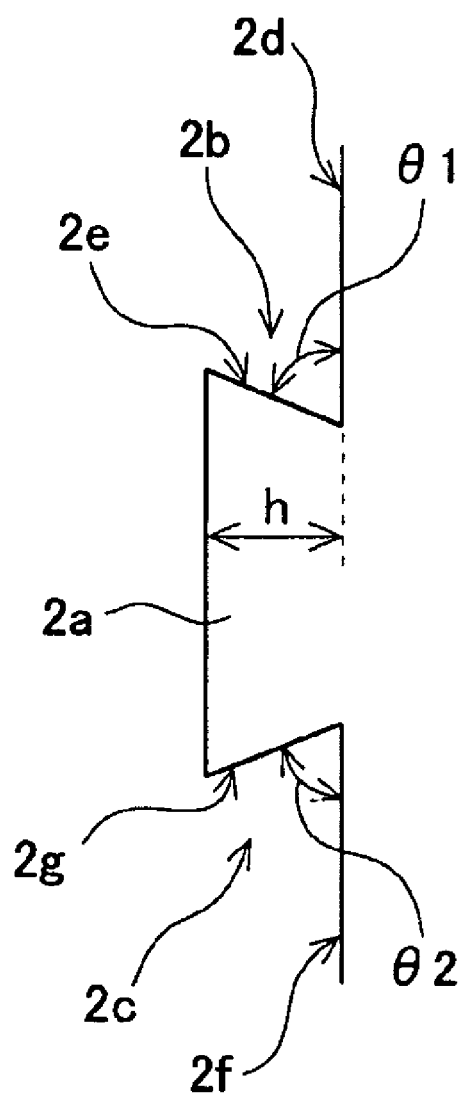
FIG. 3 shows a schematic view of details of a projecting portion on the side face of the multi-optical axis photoelectric sensor for use in the structure for mounting a multi-optical axis photoelectric sensor according to the present invention.

The multi-optical axis photoelectric sensor 2 is a columnar body for light projection, with light projector arrays accommodated in the columnar case, or a columnar body for light reception, with light receptor arrays accommodated in the columnar case. The rail-shaped projecting portion 2*a*, shown in FIG. 3, is formed on the side face of multi-optical axis photoelectric sensor 2. The top and the bottom of the projecting portion 2*a* respectively comprise engagement portions 2*b*, 2*c* so as to be gripped.

The engagement portion 2*b* is formed of a side face 2*d* and a slope 2*e* at an acute angle θ1. Similarly, the engagement portion 2*c* is formed of a side face 2*f* and a slope 2*g* at an acute angle θ2. It is preferable here that the height h of the projecting portion 2*a* be from 1 to 2 mm and the acute angles θ1, θ2 be from 45 to 75 degrees.

It should be noted that the engagement portions 2*b*, 2*c* are not necessarily symmetric, and the acute angles θ1, θ2 may be changed depending upon how force is applied. Moreover, since the projecting portion 2*a* is formed on each side face of the multi-optical axis photoelectric sensor 2, the mounting device 3 can be mounted on either side face thereof. Further, although the projecting portion 2*a* is formed in the shape of a rail, only the part for mounting the mounting device 3 may be formed in such a shape.

Figure 4:
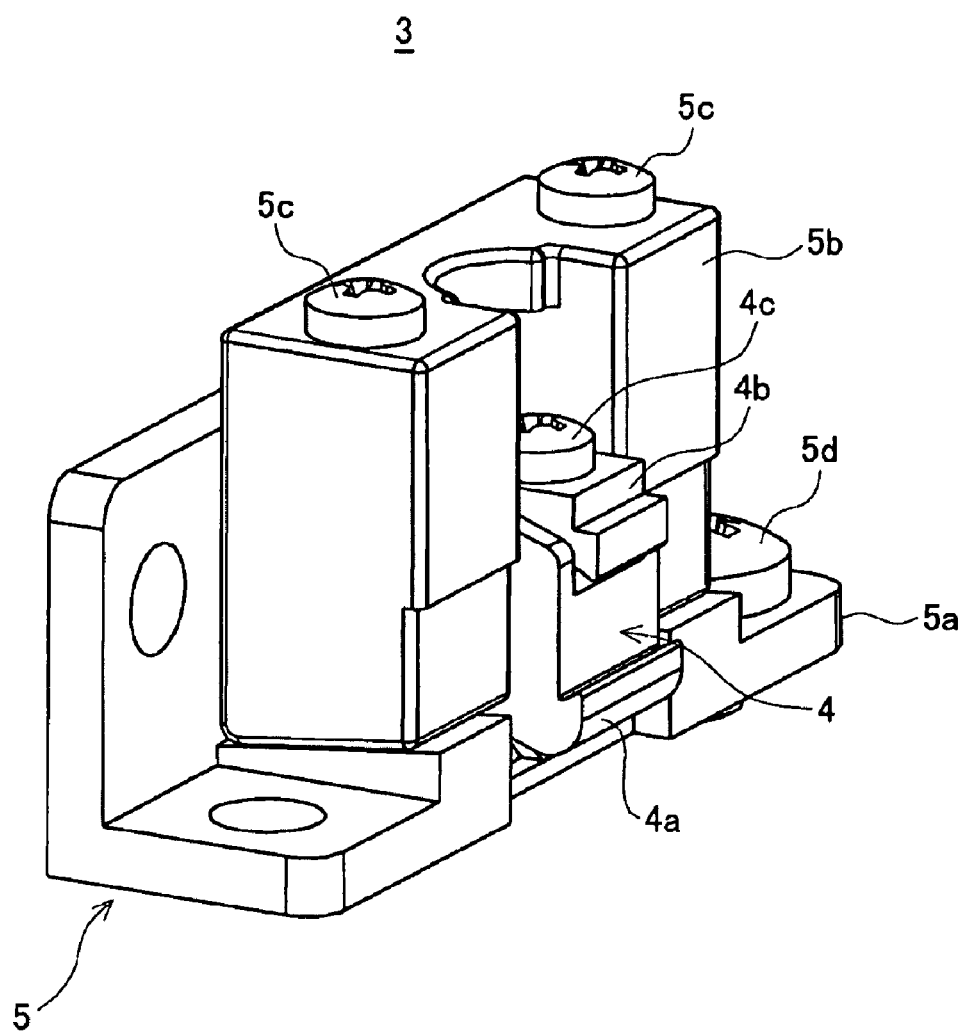
FIG. 4 shows an oblique view of a mounting device for use in the structure for mounting a multi-optical axis photoelectric sensor according to the present invention.

Next, FIG. 4 shows an oblique view of the mounting device 3. The mounting device 3 is constituted mainly of a movable-side member 4 and a fixed-side member 5. The movable-side member 4 is constituted of a lower claw member 4*a*, an upper claw member 4*b*, and a screw 4*c*. The fixed-side member 5 is constituted of a mounting angle 5*a*, a gripping member 5*b* and a screw 5*c*. It is to be noted that a screw 5*d* is used for mounting the fixed-side member 5 on a base (not shown).

Figure 5:
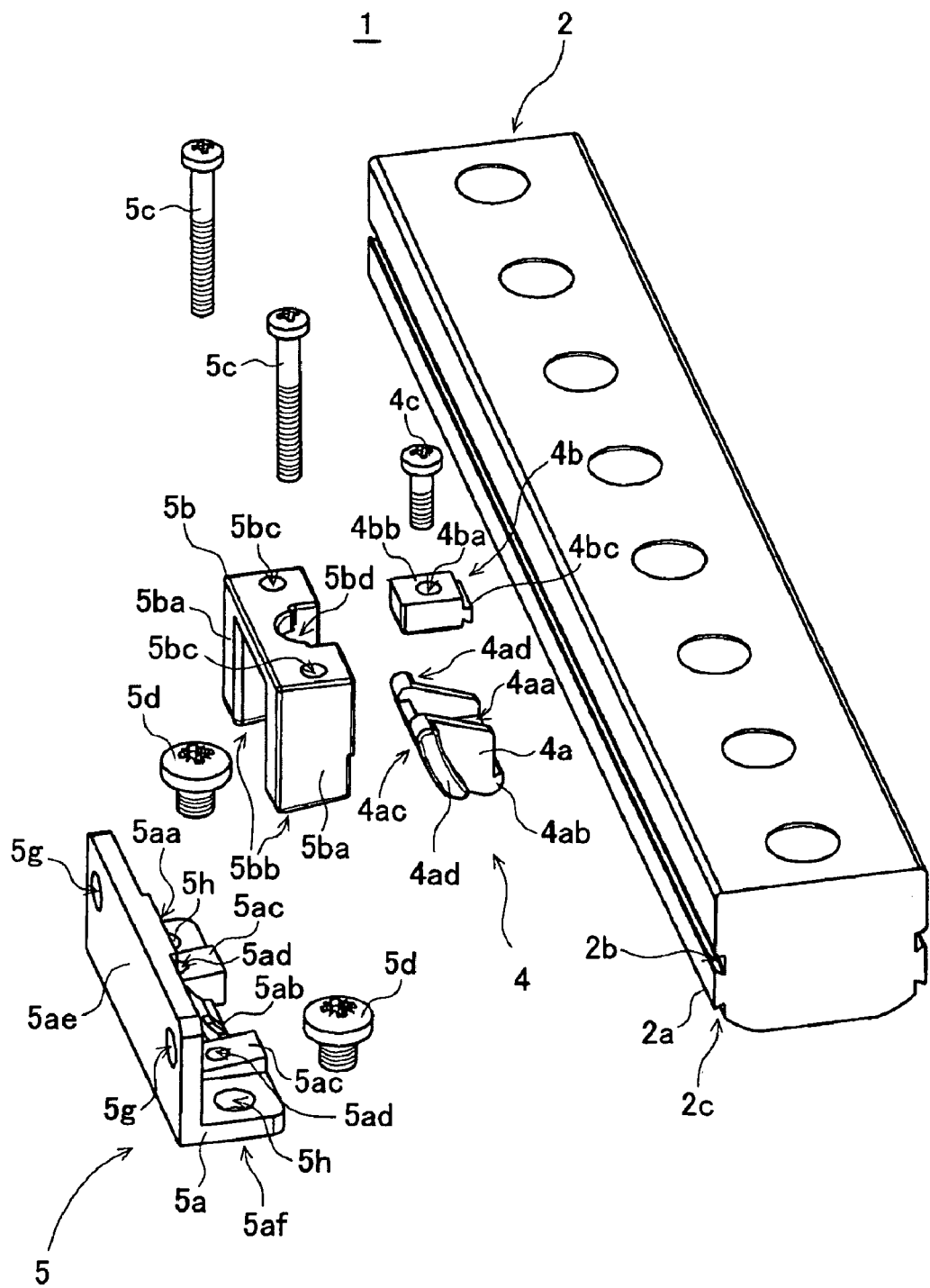
FIG. 5 shows an exploded oblique view of constituent parts for use in the structure for mounting a multi-optical axis photoelectric sensor according to the present invention.

FIG. 5 shows an exploded oblique view of the structure 1 for mounting a multi-optical axis photoelectric sensor. The lower claw member 4*a* comprises: a claw member housing portion 4*aa*, with a screw hole 4*ae* (cf. FIG. 6), provided in the central part of the bottom face thereof, a lower claw portion 4*ab*, an arc-shaped guiding convex face portion 4*ac*, and a press-holding portion 4*ad*. The upper claw member 4*b* comprises: a body portion 4*bb*, with a screw hole 4*ba* provided therein, and an upper claw portion 4*bc*.

The mounting angle 5*a* has: an arc-shaped guiding concave face portion 5*aa*, a stopper 5*ab*, provided in the lower part of the arc-shaped guiding concave face portion 5*aa*, a taper face 5*ac*, a screw hole 5*ad*, provided in the taper face, base mounting faces 5*ae*, 5*af*, and holes 5*g*, 5*h* for a screw.

The gripping member 5*b* has: a column 5*ba*, a taper face 5*bb*, provided in the lower part of the column 5*ba*, a hole 5*bc* for a screw, a pressing portion 5*be* (cf. FIG. 6), which is provided on the inner side of the column 5*ba* and press-holds the press-holding portion 4*ad* on the arc-shaped guiding concave face portion 5*aa* of the mounting angle 5*a*, and a notched portion 5*bd* for a screw.

Figure 6:
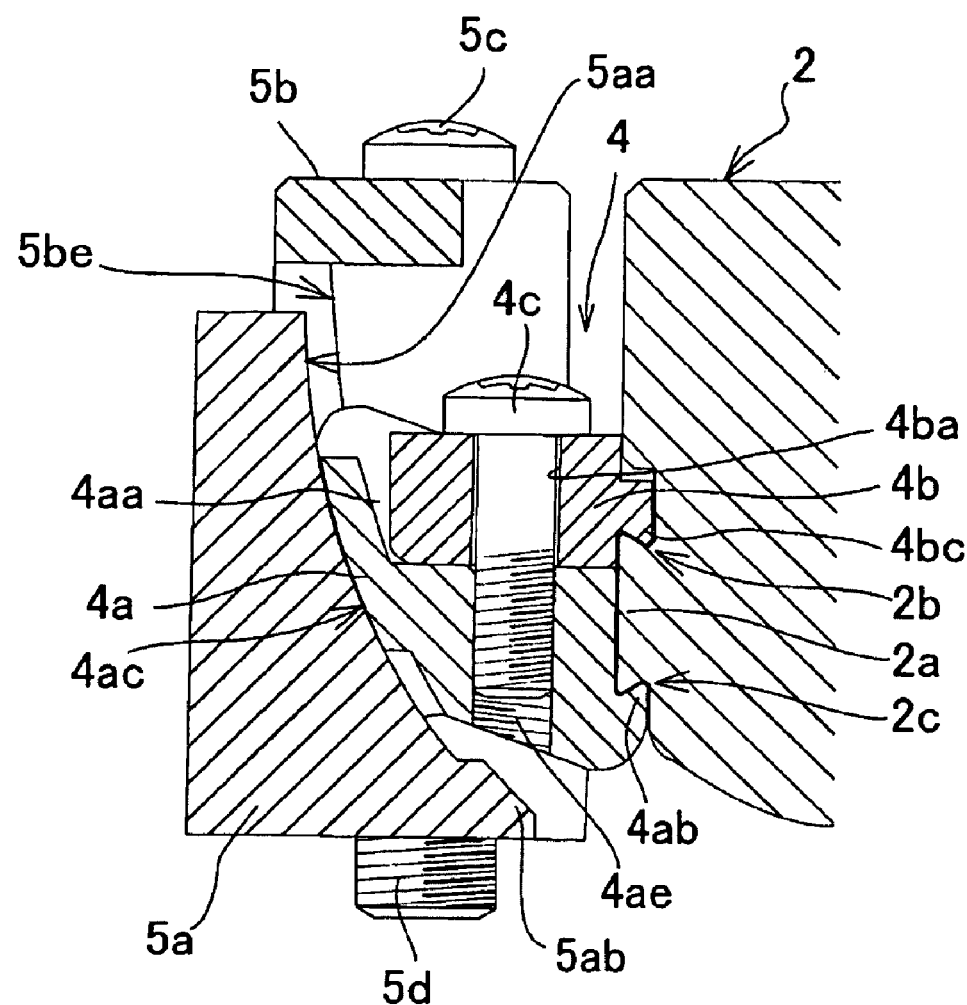
FIG. 6 shows a sectional view of the structure for mounting a multi-optical axis photoelectric sensor of the present invention.

Next, FIG. 6 shows a cross section along A—A of FIG. 2. As shown in the figure, the lower claw portion 4*ab* of the lower claw member 4*a* is engaged in the engagement portion 2*c* of the side-face projecting portion 2*a* of the multi-optical axis photoelectric sensor 2, and the upper claw portion 4*bc* of the upper claw member 4*b*, disposed in the claw member housing portion 4*aa* of the lower claw member 4*a* is engaged in the engagement portion 2*b* of the side-face projecting portion 2*a*. The screw 4*c* is inserted into the hole 4*ba* for a screw, of the upper claw member 4*b*, and then fastened into the screw hole 4*ae* in the central part of the bottom face of the claw member housing portion 4*aa* of the lower claw member 4*a*. With the screw 4*c* fastened into the screw hole, the side-face projecting portion 2*a* of the multi-optical axis photoelectric sensor 2 is gripped by the lower claw portion 4*ab* of the lower claw member 4*a* and the upper claw portion 4*bc* of the upper claw member 4*b*.

The movable-side member 4 gripping the projecting portion 2*a* is disposed such that the arc-shaped guiding convex face portion 4*ac* is in contact with the arc-shaped guiding concave face portion 5*aa* of the mounting angle 5*a*, and the gripping member 5*b* is covered. The screw 5*c* inserted in the hole 5*bc* for a screw (cf. FIG. 5) of the gripping member 5*b* is tentatively held in the screw hole 5*ad* (cf. FIG. 5) of the mounting angle 5*a*.

Figure 7:
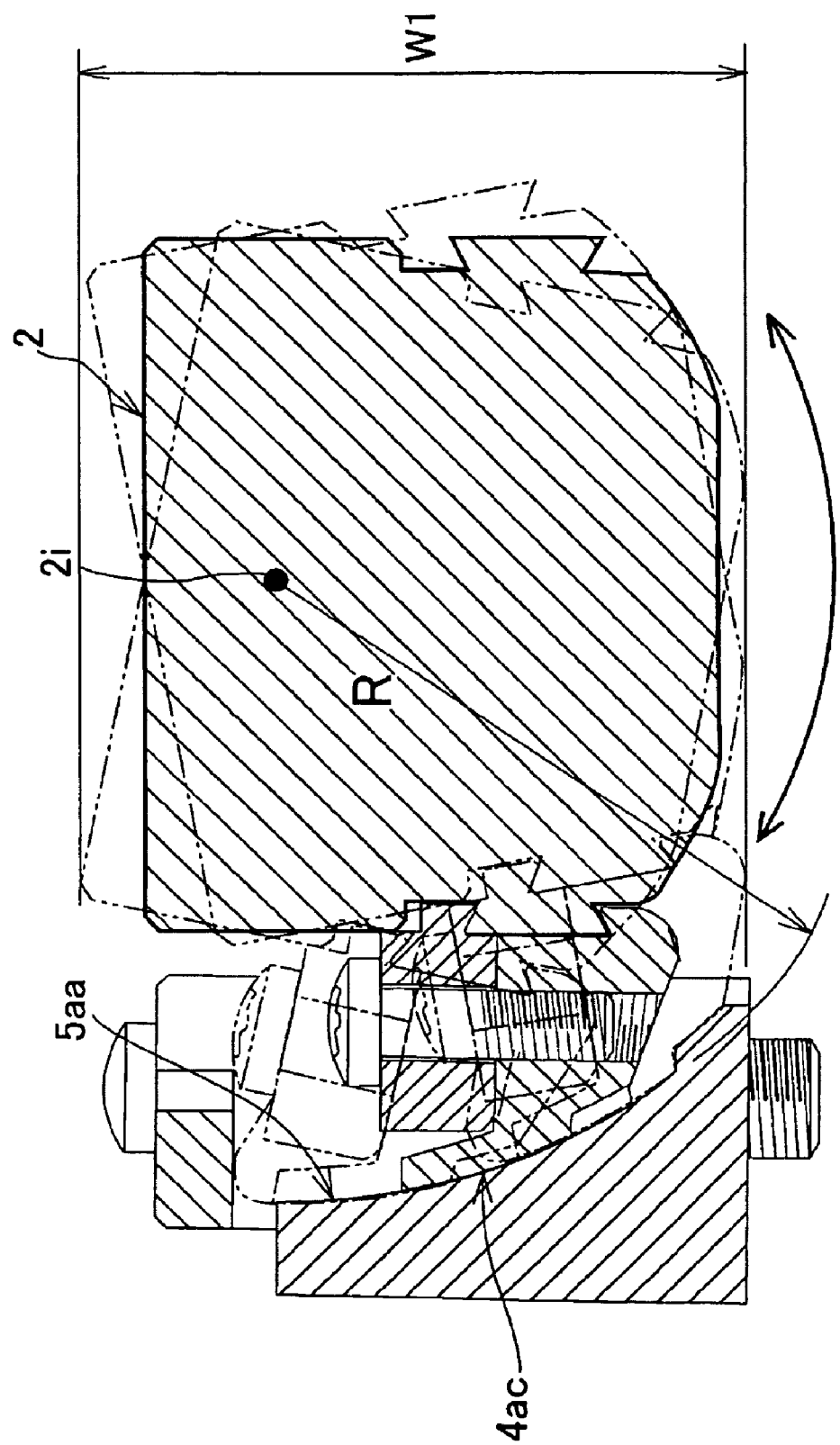
FIG. 7 shows a sectional view of an operation of the structure for mounting a multi-optical axis photoelectric sensor of the present invention.

As shown in FIG. 7, the arc-shaped guiding convex face portion 4*ac* and the arc-shaped guiding concave face portion 5*aa* are arc-shaped faces with the center at a light emitting point 2*i* of the multi-optical axis photoelectric sensor 2. The arc-shaped guiding convex face portion 4*ac* is slid over the arc-shaped guiding concave face portion 5*aa* so as to facilitate adjustment of the orientation of the multi-optical axis photoelectric sensor 2, as shown in the figure. The arc-shaped guiding convex face portion 5*be* can also be slid over the arc-shaped guiding concave face portion 4*ad*.

Naturally, the arc-shaped guiding convex face portion 5*be* may be allowed to be slid over the arc-shaped guiding concave face portion 4*ad*, while the arc-shaped guiding convex face portion 4*ac* is slid over the arc-shaped guiding concave face portion 5*aa*. According to such a constitution, a mounting space can be a width of W1, and hence a space for a mounting device 10 is not required unlike the conventional example, whereby the space can be saved.

After fixing of the mounting angle 5*a* to a base (not shown) with the screw 5*d*, and adjustment of the orientation of the multi-optical axis photoelectric sensor 2, the screw 5*c* is fastened. The taper face 5*bb* of the gripping member 5*b* then slides over the taper face 5*ac* of the mounting angle 5, and the pressing portion 5*be* presses the press-holding portion 4*ad*, so that the press-holding portion 4*ad* is gripped by the pressing portions 5*be* and the arc-shaped guiding concave face portion 5*aa*. Hence it is possible to fix the orientation of the multi-optical axis photoelectric sensor 2.

Figure 8:
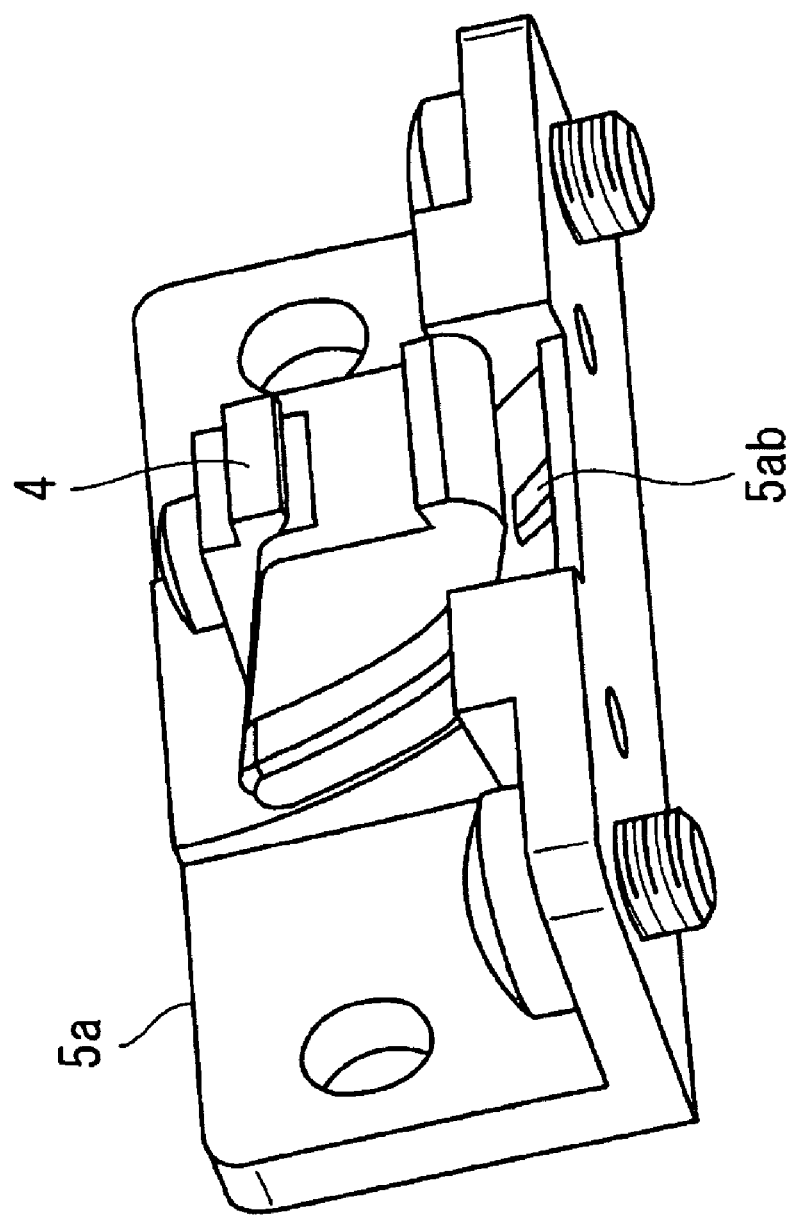
FIG. 8 shows an oblique view of one embodiment of amounting angle for use in the structure for mounting a multi-optical axis photoelectric sensor according to the present invention.

It should be noted that, since the mounting angle 5*a* comprises the stopper 5*ab* as shown in FIG. 8, the movable-side member 4 does not drop off the fixed-side member 5 even when moved for the purpose of adjusting the orientation of the multi-optical axis photoelectric sensor 2, as shown in FIG. 7.

Figure 9:
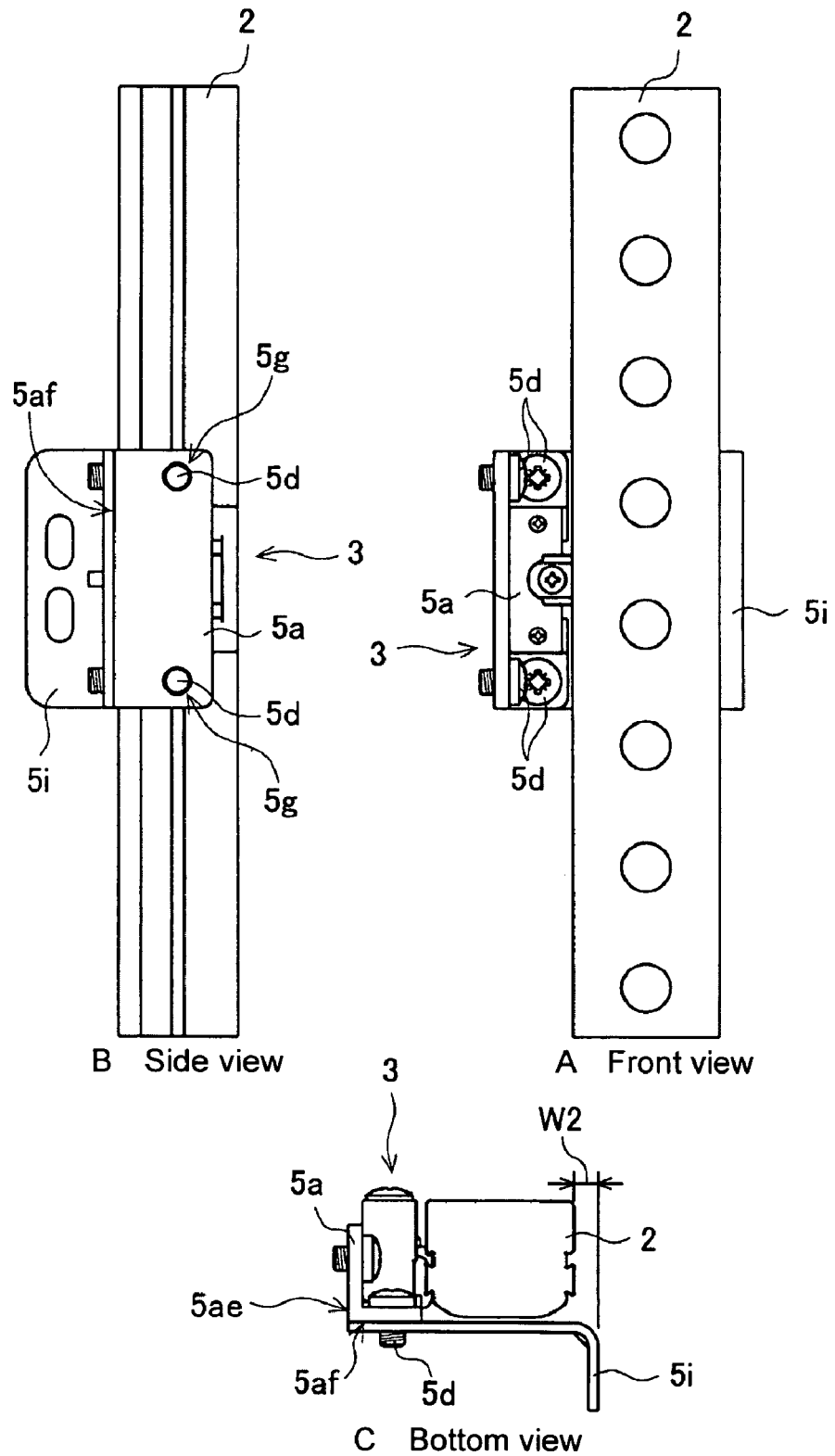
FIG. 9 shows a trihedral view of another example of the method for mounting, on the base, the mounting device for use in the structure for mounting a multi-optical axis photoelectric sensor according to the present invention.

Further, FIG. 9 shows a trihedral view of another example of the method for mounting, on the base, the mounting device 3 for use in the structure 1 for mounting a multi-optical axis photoelectric sensor according to the present invention. While the case was described where the multi-optical axis photoelectric sensor 2 is disposed with the back face thereof facing the base mounting face as shown in FIG. 1 and the like above, the multi-optical axis photoelectric sensor 2 can also be disposed with the side face thereof facing the base mounting face as shown in FIG. 9.

One of such mounting methods is a method of mounting the base mounting face 5*ae* of the mounting angle 5*a* on the base. In this method, the multi-optical axis photoelectric sensor cannot be mounted from the front face thereof. It is therefore necessary that, after mounting the mounting angle 5*a* on the base, the movable-side member 4 gripping the projecting portion 2*a* of the multi-optical axis photoelectric sensor 2 be disposed on the mounting angle 5*a*, followed by fixing of the gripping member 5*b*.

There is also a method of mounting the mounting device 3 on the angle 5*i* mounted on the base. In this case, since the base mounting face 5*af* of the mounting device 3 is mounted, the multi-optical axis photoelectric sensor 2 can be mounted from the front face thereof. It is further possible in this case to narrow a space W2 between the side face of the multi-optical axis photoelectric sensor 2 and the base.

Next, another preferred embodiment of the structure for mounting a multi-optical axis photoelectric sensor according to the present invention is specifically described in accordance with attached drawings.

Figure 10:
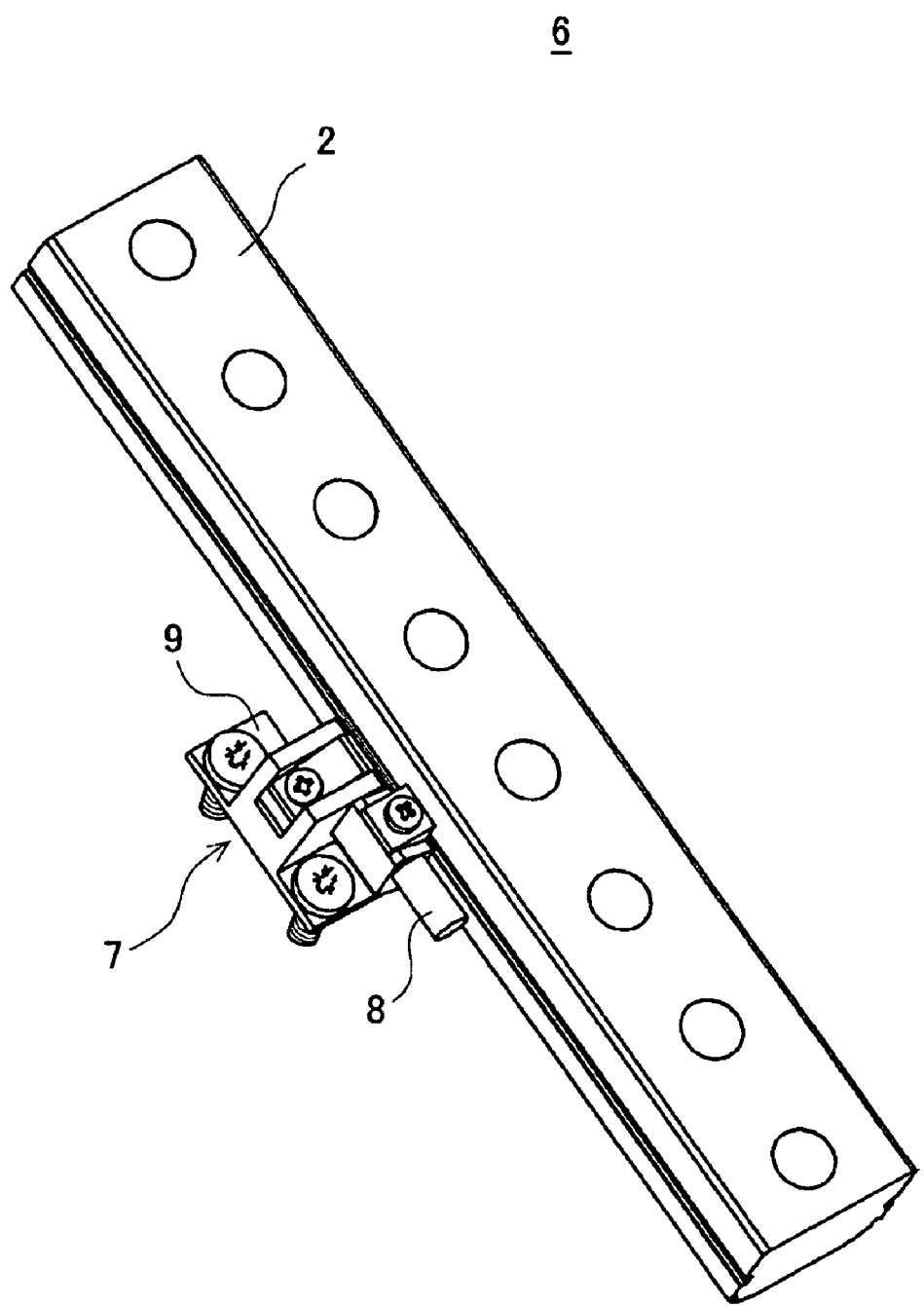
FIG. 10 shows an overall oblique view of another example of the structure for mounting a multi-optical axis photoelectric sensor according to the present invention.

FIG. 10 shows an overall oblique view of another example of the structure for mounting a multi-optical axis photoelectric sensor according to the present invention. As shown in the figure, a structure 6 for mounting a multi-optical axis photoelectric sensor is composed of the multi-optical axis photoelectric sensor 2 described above and a mounting device 7, and the mounting device 7 is composed of a movable-side member 8 and a fixed-side member 9.

Figure 11:
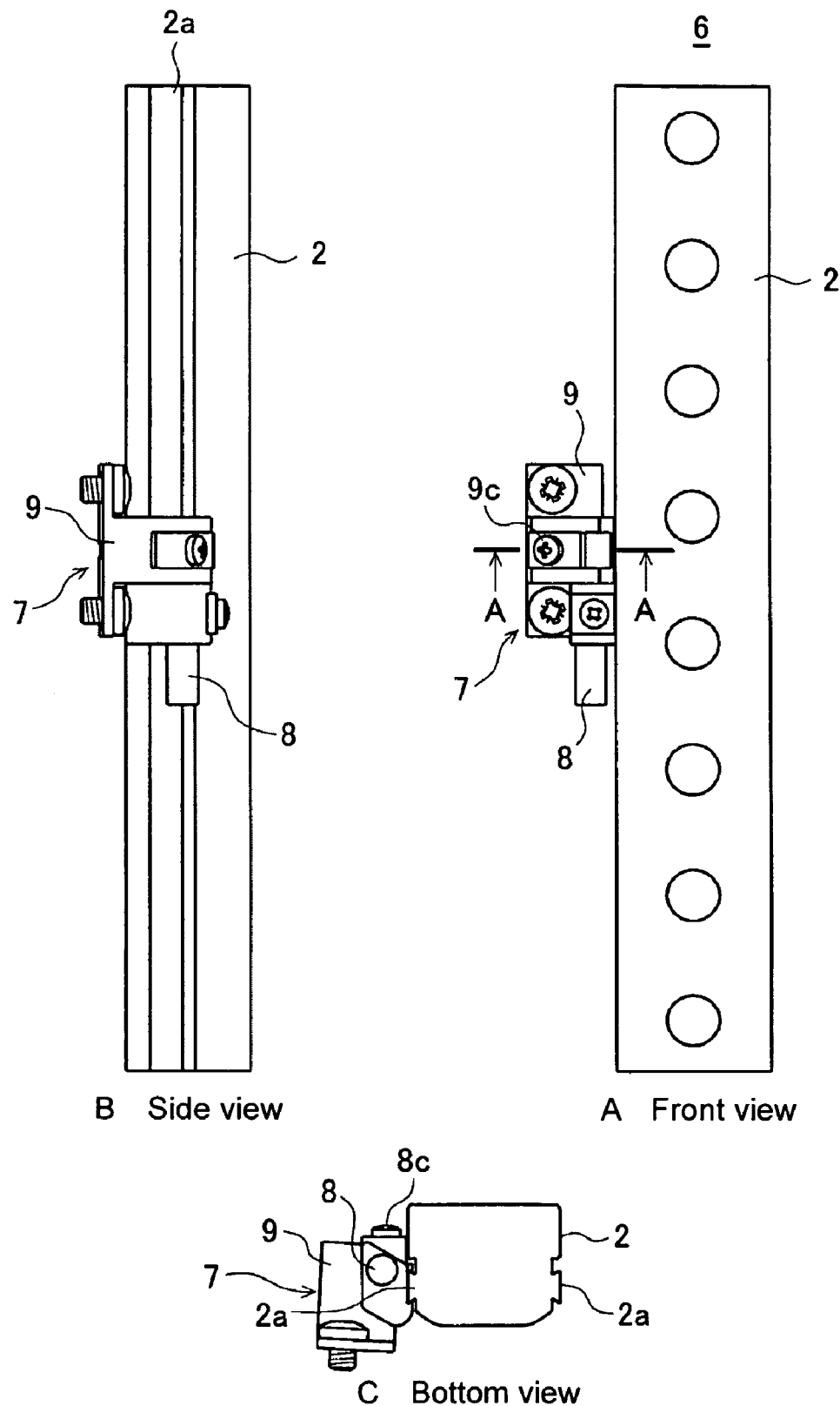
FIG. 11 shows a trihedral view of another example of the structure for mounting a multi-optical axis photoelectric sensor according to the present invention.

On the side face of the multi-optical axis photoelectric sensor 2, the projecting portion 2*a* is formed as thus described, and held from both sides thereof by the movable-side member 8. This movable-side member 8 is rotatably supported by the fixed-side member 9. The fixed-side member 9 is fixed to a base (not shown). It is to be noted that FIG. 11 shows a trihedral view of the structure 6 for mounting a multi-optical axis photoelectric sensor.

Figure 12:
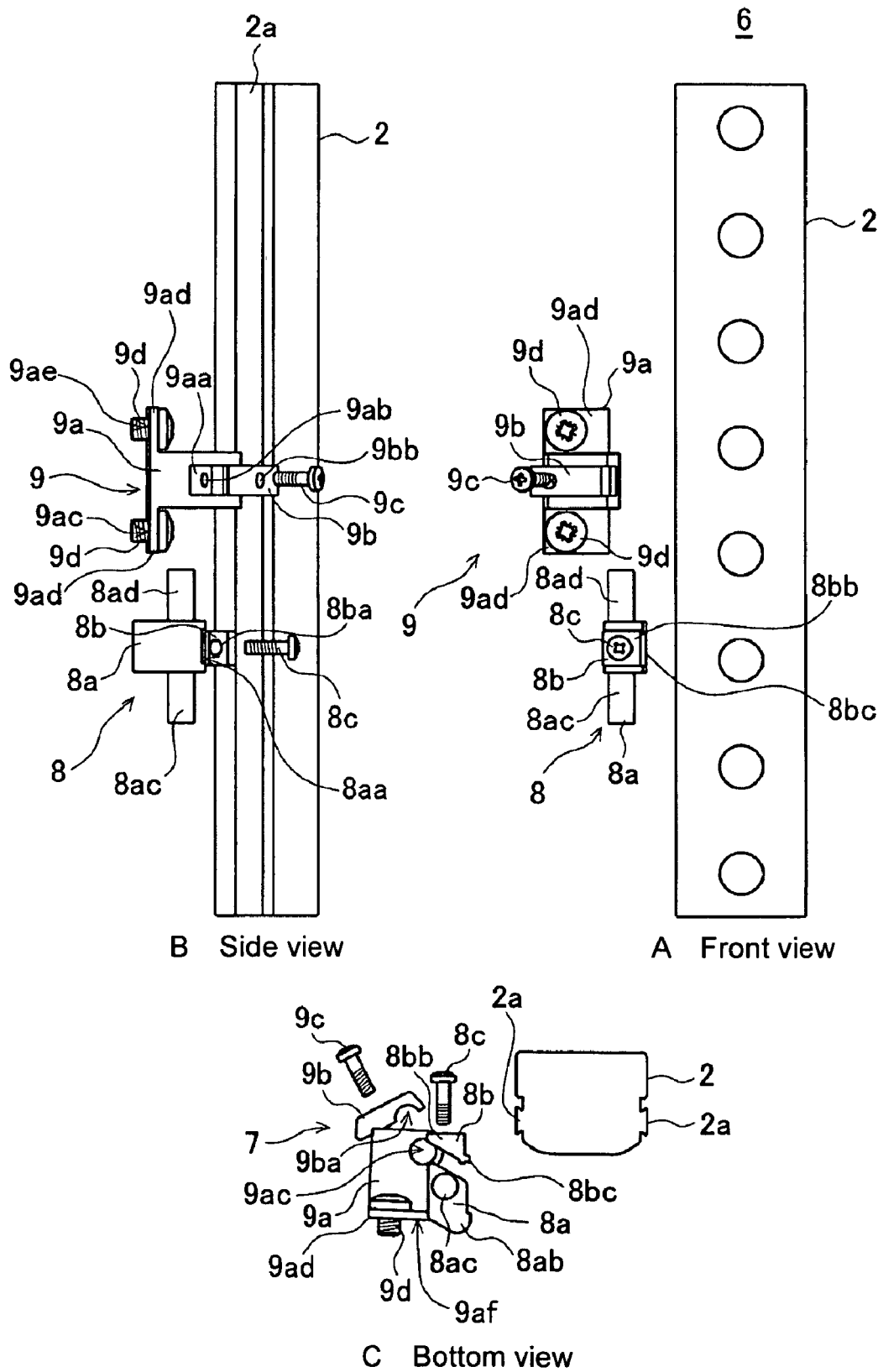
FIG. 12 shows an exploded trihedral view of constituent parts for use in another example of the structure for mounting a multi-optical axis photoelectric sensor according to the present invention.

FIG. 12 shows a trihedral view of the structure 6 for mounting a multi-optical axis photoelectric sensor in a state exploded into the constituents thereof, which are the multi-optical axis photoelectric sensor 2, the movable-side member 8 and the fixed-side member 9. The movable-side member 8 is constituted of a lower claw member 8*a*, an upper claw member 8*b*, and a screw 8*c*. The fixed-side member 9 is constituted of a mounting portion body 9*a*, a gripping member 9*b* and screws 9*c*. It is to be noted that a screw 9*d* is used for mounting the fixed-side member 9 on the base.

The lower claw member 8*a* comprises: a claw member housing portion 8*aa*, with a screw hole (not shown) provided in the central part of the bottom face thereof, a lower claw portion 8*ab*, and axis body portions 8*ac*, 8*ad*. The upper claw member 8*b* comprises: a body portion 8*bb*, with a screw hole 8*ba* provided therein, and an upper claw portion 8*bc*. The mounting portion body 9*a* has: a placement portion 9*aa*, where the gripping member 9*b* is placed, a screw hole 9*ab*, provided in the bottom face of the placement portion 9*aa*, an axis-shaped portion 9*ac*, into which the axis body portions 8*ac*, 8*ad* are to be inserted, a leg body 9*ad*, and a hole 9*ae* for a screw, provided in the leg body 9*ad*. The gripping member 9*b* has: an axis body gripping portion 9*ba*, and a hole 9*bb* for a screw.

Figure 13:
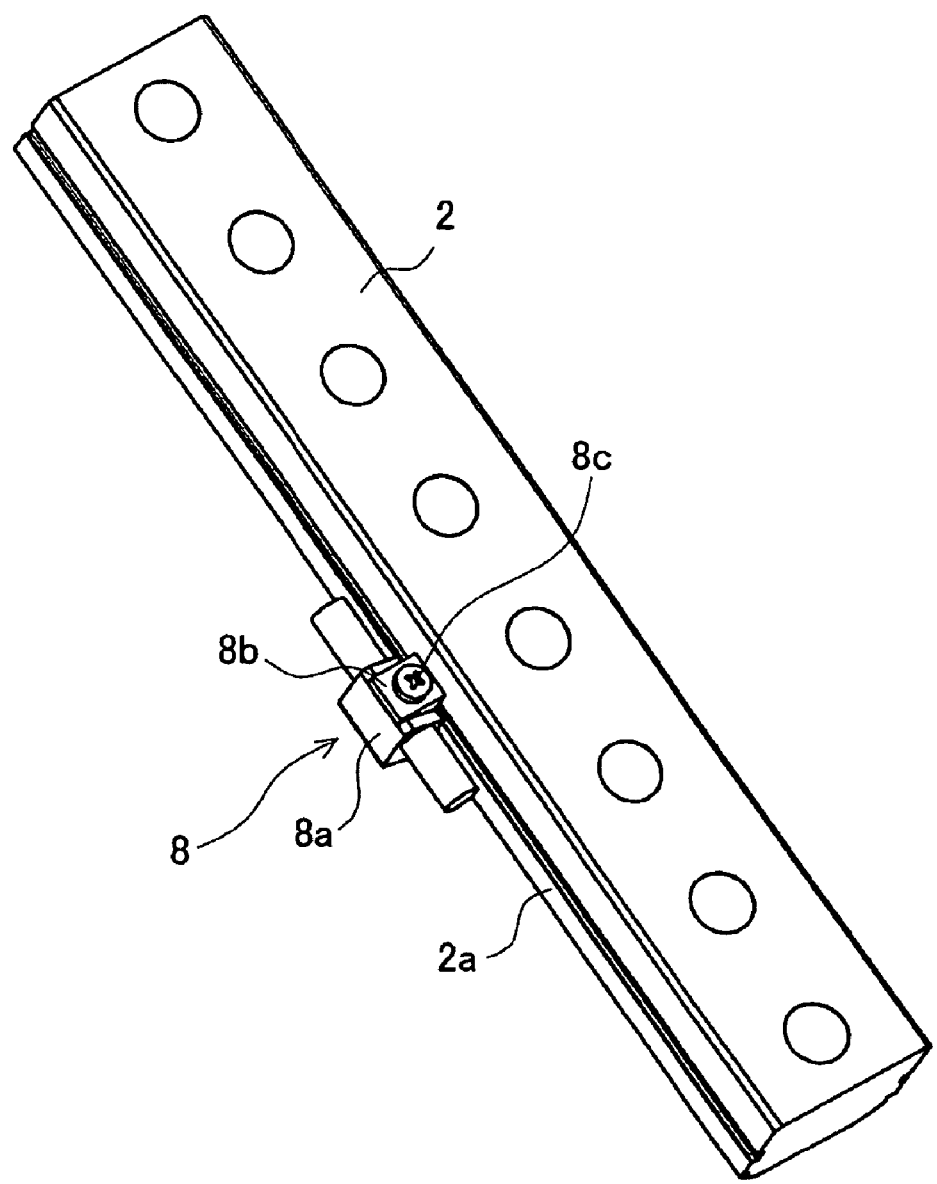
FIG. 13 shows an oblique view of fixing of a movable-side member in accordance with another example of the structure for mounting a multi-optical axis photoelectric sensor according to the present invention.
Figure 14:
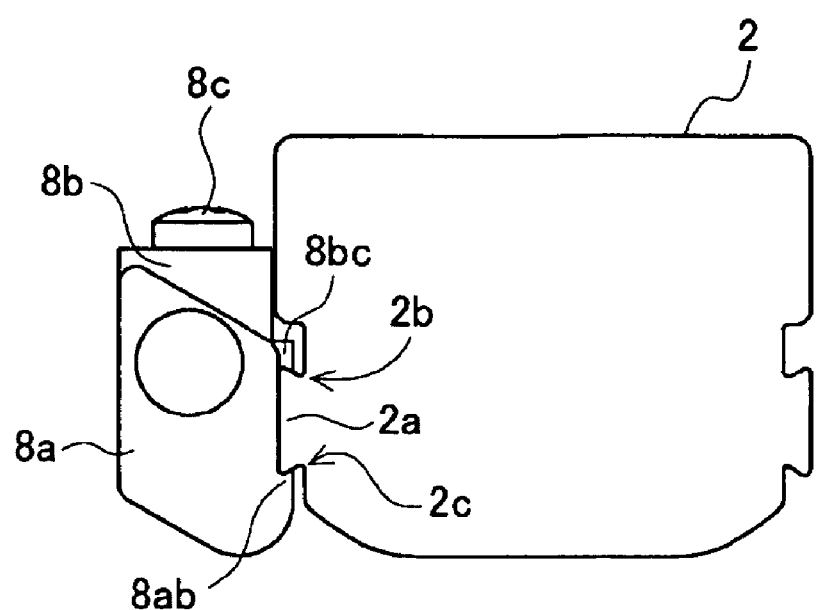
FIG. 14 shows a view of fixing of a movable-side member in accordance with another example of the structure for mounting a multi-optical axis photoelectric sensor according to the present invention.

Next, FIG. 13 shows an oblique view of a state where the projecting portion 2*a* of the multi-optical axis photoelectric, sensor 2 is gripped by the movable-side member 8, and FIG. 14 shows a view of fixing of the movable-side member 8. The lower claw portion 8*ab* of the lower claw member 8*a* is engaged in the engagement portion 2*c* on the side face of the multi-optical axis photoelectric sensor 2, and the upper claw portion 8*bc* of the upper claw member 8*b* is engaged in the engagement portion 2*b*. The screw 8*c* is inserted into the hole 8*ba* for a screw, of the upper claw member 8*b*, and then fastened into the screw hole (not shown) in the central part of the bottom face of the claw member housing portion 8*aa* of the lower claw member 8*a*. With the screw 8*c* fastened into the screw hole, the side-face projecting portion 2*a* of the multi-optical axis photoelectric sensor 2 is gripped by the lower claw portion 8*ab* of the lower claw member 8*a* and the upper claw portion 8*bc* of the upper claw member 8*b*.

Figure 15:
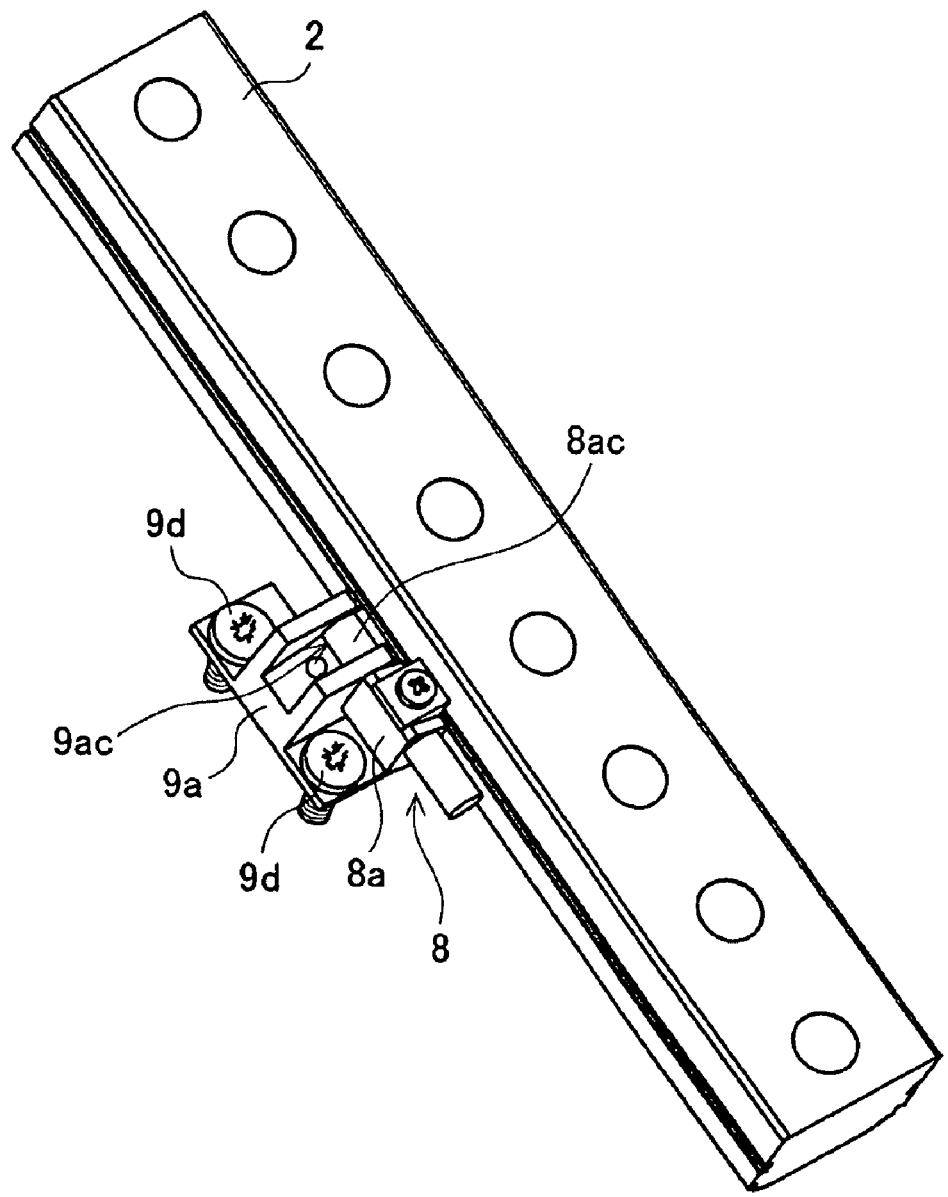
FIG. 15 shows an oblique view of fixing of the movable-side member and a mounting portion body in accordance with another example of the structure for mounting a multi-optical axis photoelectric sensor according to the present invention.

As shown in FIG. 15, the axis body 8*ac* of the lower claw member 8*a* in the movable-side member 8, to which the screw 8*c* is fixed, is inserted into the axis-shaped portion 9*ac* of the mounting portion body 9*a*. Since the axis-shaped portion 9*ac* rotatably supports the axis body 8*ac*, the orientation of the multi-optical axis photoelectric sensor 2 can be adjusted. It is to be noted that, since the axis bodies 8*ac*, 8*ad* are symmetrically formed, the direction of the insertion is selectable depending upon the shape of the base.

Figure 16:
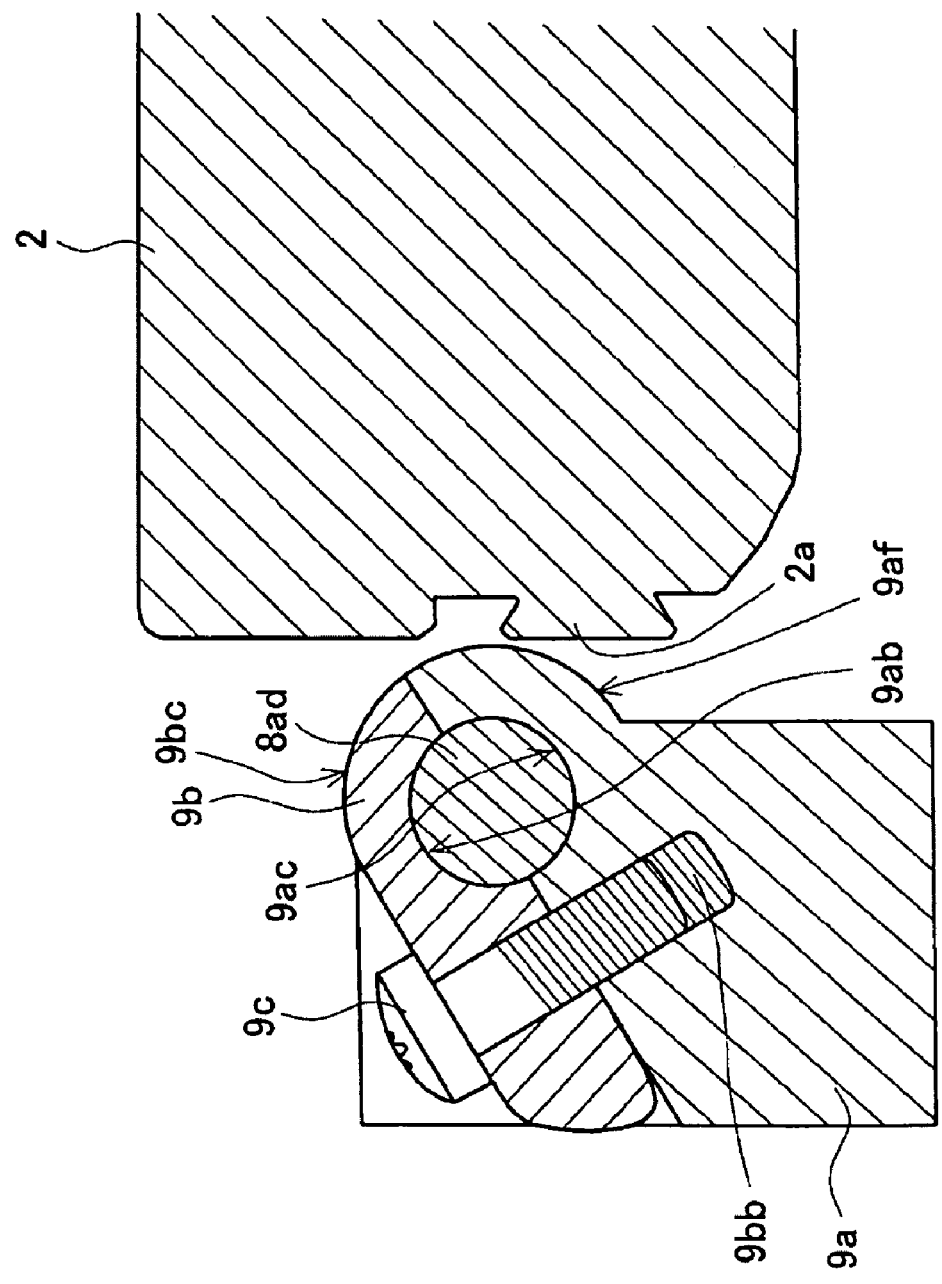
FIG. 16 shows a sectional view in accordance with another example of the structure for mounting a multi-optical axis photoelectric sensor according to the present invention.
Figure 17:
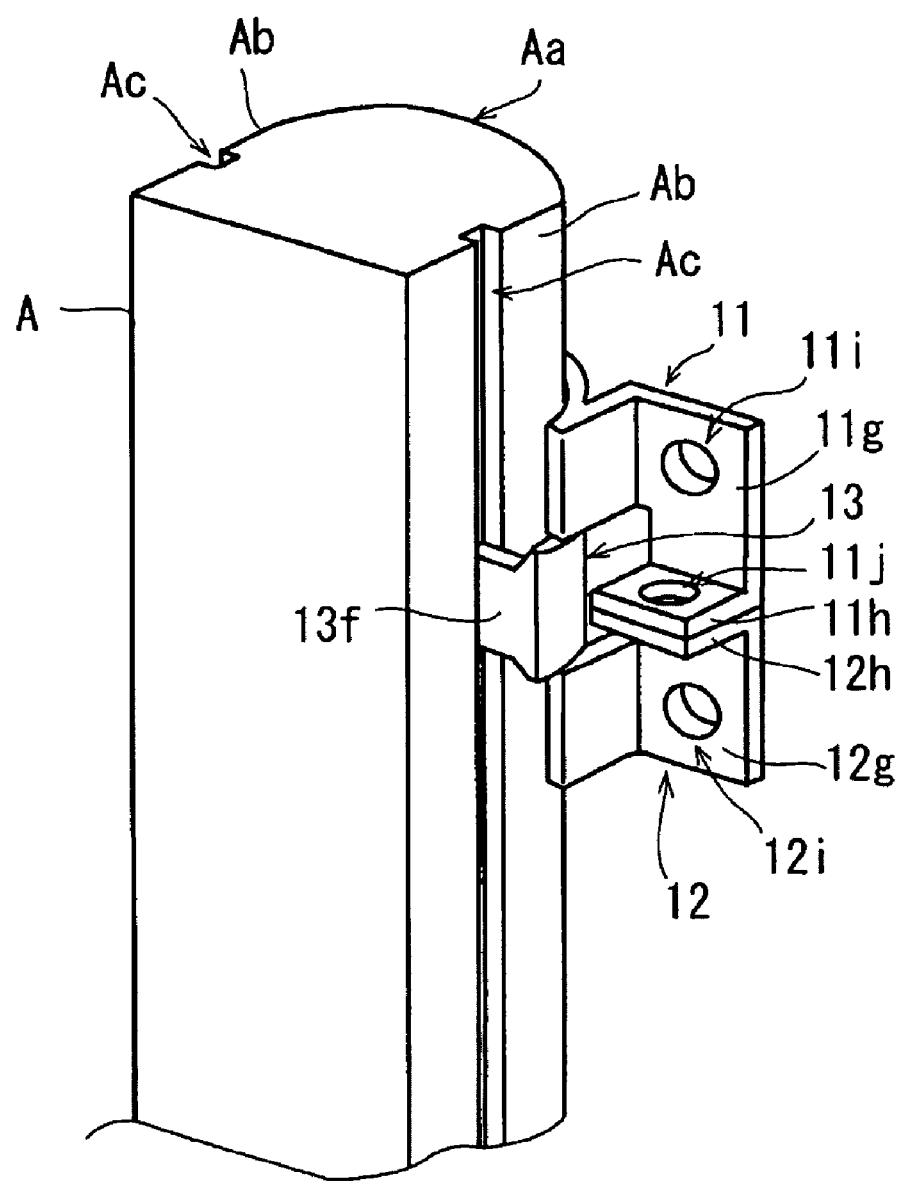
FIG. 17 shows a schematic oblique view of amounting device for a conventional multi-optical axis photoelectric sensor.
Figure 18:
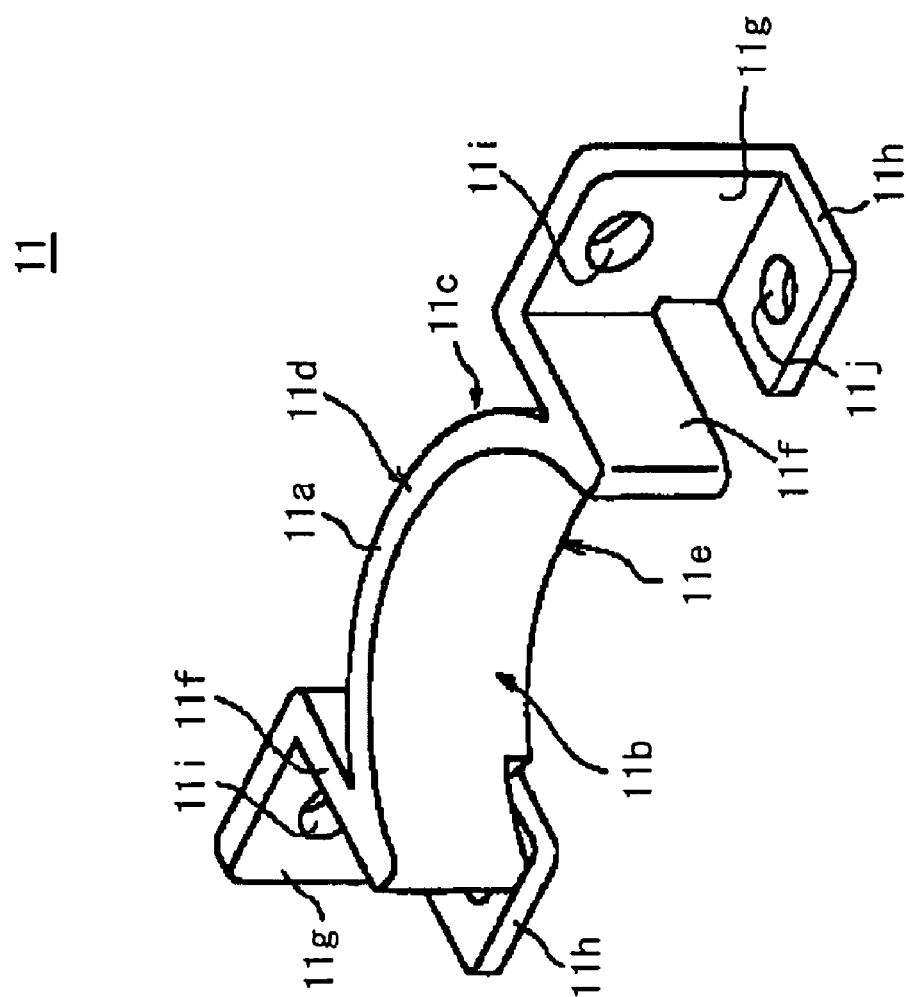
FIG. 18 shows a schematic oblique view of a first member for use in the mounting device for the conventional multi-optical axis photoelectric sensor.
Figure 19:
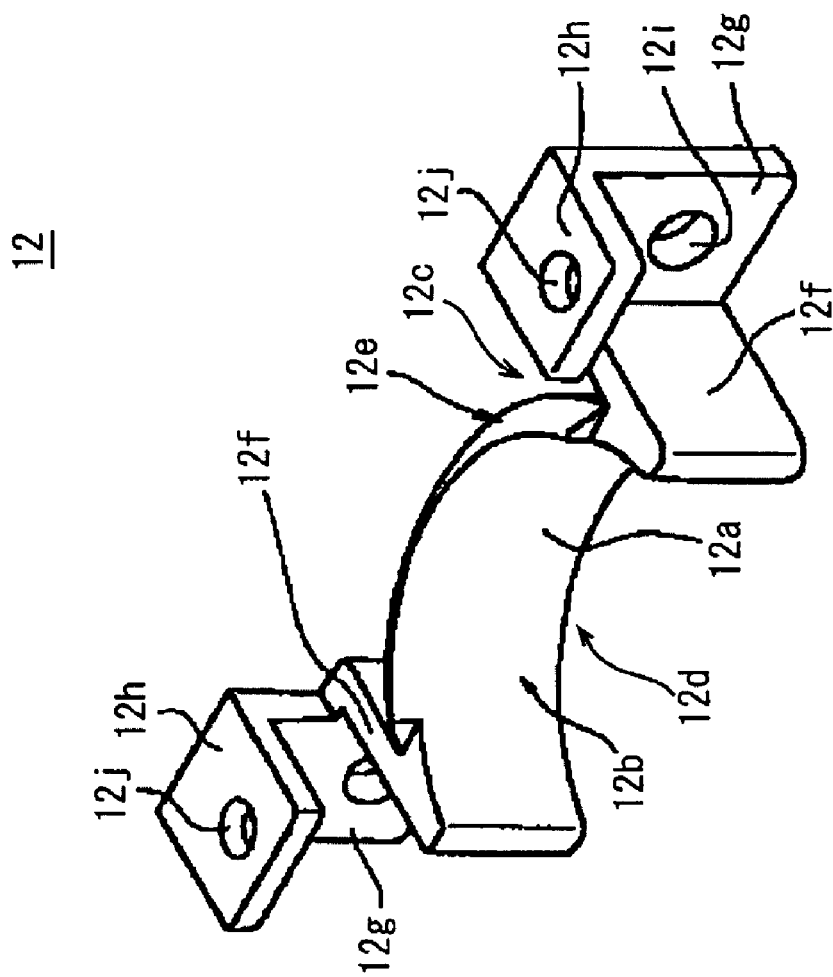
FIG. 19 shows a schematic oblique view of a second member for use in the mounting device for the conventional multi-optical axis photoelectric sensor.
Figure 20:
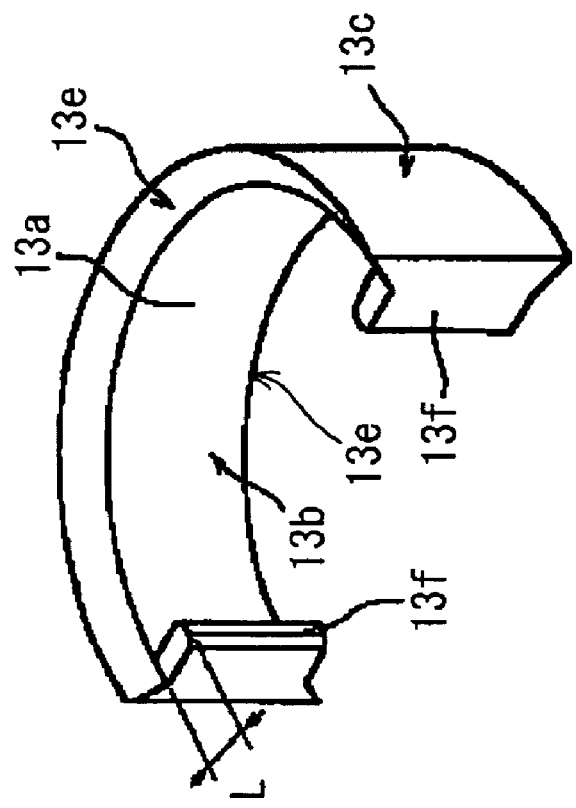
FIG. 20 shows a schematic oblique view of a third member for use in the mounting device for the conventional multi-optical axis photoelectric sensor.

Furthermore, as shown in FIG. 16, since a side face 9*af* in the vicinity of the axis-shaped portion 9*ac* of the mounting portion body 9*a* and a side face 9*bc* in the vicinity of the axis body gripping portion 9*ba* of the gripping member 9*b* are arc-shaped faces concentric to the axis-shaped portion 9*ac* and the axis body gripping portion 9*ba*, the multi-optical axis photoelectric sensor 2 can be significantly rotated.

The structure for mounting a multi-optical axis photoelectric sensor according to the present invention was described above, showing the preferred embodiments. However, it goes without saying that the structure for mounting a multi-optical axis photoelectric sensor according to the present invention is not limited to the foregoing embodiments, and a variety of changes can be made within the scope of the present invention.

What is claimed is:

1. A structure for mounting a multi-optical axis photoelectric sensor having a front face and a back face, in which a columnar case for light projection or light reception that constitutes a multi-optical axis photoelectric sensor is mounted on a supporting wall with a back face of the columnar case facing a supporting wall side, to enable adjustment of an angle of light axis, the structure comprising:
- a rail-shaped projecting portion, formed on one side face or each side face of the columnar case along the longitudinal direction thereof,
- a movable-side member, having a gripping mechanism which detachably grips a rail-shaped projecting portion of the columnar case,
- a mounting portion, mountable on a supporting wall from the side facing the supporting wall, and
- a fixed-side member, rotatably supporting the movable-side member via a supporting mechanism, with the mounting portion mounted in a state where the columnar case is positioned on the side of the mounting portion, and further comprising
- a position fixing mechanism which fixes a positional relation between the movable-side member and the fixed-side member in an arbitrarily rotated position, whereby
- the fixed-side member positioned on the side of the columnar case makes the columnar case adjustable to an arbitrary optical axis angle via the movable-side member.

2. The structure for mounting a multi-optical axis photoelectric sensor according to claim 1, wherein, with the front face of the multi-optical axis photoelectric sensor being the upper side and the back face thereof being the lower side, the gripping mechanism comprises: a lower claw member, having a claw-shaped portion to be engaged with the lower side of the rail-shaped projecting portion, an upper claw member, having a claw-shaped portion to be engaged with the upper side of the rail-shaped projecting portion, and a screw mechanism, which fastens the lower claw member and the upper claw member.

3. The structure for mounting a multi-optical axis photoelectric sensor according to claim 1, wherein the supporting mechanism for rotatably supporting the movable-side member on the fixed-side member allows an arc-shaped guiding convex face provided on the movable-side member to be slid over an arc-shaped guiding concave face provided on the fixed-side member.

4. The structure for mounting a multi-optical axis photoelectric sensor according to claim 3, wherein
the movable-side member further comprises an arc-shaped guiding concave face concentric to the arc-shaped guiding convex face,
the fixed-side member further comprises an arc-shaped guiding convex face, and
the supporting mechanism for rotatably supporting the movable-side member on the fixed-side member allows the arc-shaped guiding convex face provided on the movable-side member to be slid over an arc-shaped guiding concave face provided on the fixed-side member, or allows the arc-shaped guiding convex face provided on the fixed-side member to be slid over an arc-shaped guiding concave face provided on the movable-side member.

5. The structure for mounting a multi-optical axis photoelectric sensor according to claim 4, wherein the center of arcs of the arc-shaped guiding convex face and the arc-shaped guiding concave face is a light emitting point or a light receiving point of the multi-optical axis photoelectric sensor.

6. The structure for mounting a multi-optical axis photoelectric sensor according to claim 4, wherein the arc-shaped guiding concave face comprises a projecting portion for preventing the arc-shaped concave face from dropping.

7. The structure for mounting a multi-optical axis photoelectric sensor according to claim 3, wherein the center of arcs of the arc-shaped guiding convex face and the arc-shaped guiding concave face is a light emitting point or a light receiving point of the multi-optical axis photoelectric sensor.

8. The structure for mounting a multi-optical axis photoelectric sensor according to claim 7, wherein
the fixed-side member includes a mounting angle and a gripping member, constituting a screw mechanism which fastens a screw in a direction from the front face of the multi-optical axis photoelectric sensor toward the back face thereof so as to fix the fixed-side member and the multi-optical axis photoelectric sensor to one another,
the gripping member has the arc-shaped guiding convex face of the fixed-side member and a taper face inclined with respect to the direction in which the screw mechanism fastens a screw,
the mounting angle has: the arc-shaped guiding concave face of the fixed-side member, and a taper receiving face, which is inclined in the same direction as the taper face of the gripping member in a state of being fixed to the gripping member, and is in contact with the taper face, and
the screw mechanism is fastened to generate force in a screw fastened direction and force in a direction along the taper face, so as to press-hold the arc-shaped guiding convex face of the gripping member on the arc-shaped guiding concave face of the movable-side member, and press-hold the arc-shaped guiding convex face of the movable-side member on the arc-shaped guiding concave face of the mounting angle.

9. The structure for mounting a multi-optical axis photoelectric sensor according to claim 3, wherein the arc-shaped guiding concave face comprises a projecting portion for preventing the arc-shaped concave face from dropping.

10. The structure for mounting a multi-optical axis photoelectric sensor according to claim 1, wherein
the movable-side member comprises an arc-shaped guiding concave face,
the fixed-side member comprises an arc-shaped guiding convex face, and
the supporting mechanism for rotatably supporting the movable-side member on the fixed-side member allows the arc-shaped guiding convex face provided on the fixed-side member to be slid over the arc-shaped guiding concave face provided on the movable-side member.

11. The structure for mounting a multi-optical axis photoelectric sensor according to claim 10, wherein the center of arcs of the arc-shaped guiding convex face and the arc-shaped guiding concave face is a light emitting point or a light receiving point of the multi-optical axis photoelectric sensor.

12. The structure for mounting a multi-optical axis photoelectric sensor according to claim 10, wherein the arc-shaped guiding concave face comprises a projecting portion for preventing the arc-shaped concave face from dropping.

* * * * *